(12) United States Patent
Chang et al.

(10) Patent No.: US 11,122,305 B2
(45) Date of Patent: Sep. 14, 2021

(54) MULTIMEDIA STREAMING AND NETWORK APPARATUS

(71) Applicant: Realtek Semiconductor Corporation, Hsinchu (TW)

(72) Inventors: Chia-Jung Chang, Hsinchu (TW); Chien-Lien Peng, Zhubei (TW); Fu-Ching Hsu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 125 days.

(21) Appl. No.: 16/525,991

(22) Filed: Jul. 30, 2019

(65) Prior Publication Data

US 2020/0275137 A1    Aug. 27, 2020

(30) Foreign Application Priority Data

Feb. 27, 2019  (TW) .................. 108106886

(51) Int. Cl.
*H04N 7/173* (2011.01)
*H04N 21/235* (2011.01)
*H04N 21/218* (2011.01)
*G06F 3/06* (2006.01)

(52) U.S. Cl.
CPC ....... *H04N 21/2355* (2013.01); *G06F 3/0605* (2013.01); *G06F 3/0659* (2013.01); *G06F 3/0679* (2013.01); *H04N 21/2182* (2013.01); *H04N 21/2353* (2013.01)

(58) Field of Classification Search
CPC ........... H04N 21/2353; H04N 21/2355; H04N 21/4402; G06F 3/0605; G06F 3/0659; G06F 3/0679
See application file for complete search history.

(56) References Cited

U.S. PATENT DOCUMENTS 8,220,027 B1 *  7/2012  Dagman ............ H04N 21/2343 725/93
10,228,866 B2 *  3/2019  Gerhart ................ G06F 3/0613
2003/0002856 A1   1/2003  Kim et al.
(Continued)

FOREIGN PATENT DOCUMENTS

TW       201304518 A    1/2013
TW       201351969 A    12/2013

*Primary Examiner* — Gigi L Dubasky

(74) *Attorney, Agent, or Firm* — Locke Lord LLP; Tim Tingkang Xia, Esq.

(57) ABSTRACT

A multimedia streaming and network apparatus that includes a flash memory, a network module, an access module and a multimedia streaming module is provided. The network module includes a network processing circuit. The access module includes a flash memory controller and an access circuit. The flash memory controller controls and accesses the flash memory. The access circuit includes a network processing storage circuit, a command and data transmission circuit and an interface converting circuit. The command and data transmission circuit performs transmission of command and data between the processing storage circuit and the network processing circuit. The interface converting circuit performs transmission and interface conversion between the network processing storage circuit and the flash memory controller. The multimedia streaming module accesses the flash memory through the flash memory controller.

10 Claims, 3 Drawing Sheets

(56) References Cited

U.S. PATENT DOCUMENTS

| | | | |
|---|---|---|---|
| 2003/0023822 A1* | 1/2003 | Scott | G06F 12/1433 |
| | | | 711/163 |
| 2008/0145028 A1* | 6/2008 | Nakamuta | G11B 20/10527 |
| | | | 386/353 |
| 2015/0269093 A1* | 9/2015 | Burton | G06F 12/1458 |
| | | | 711/103 |
| 2017/0199706 A1* | 7/2017 | Kim | G06F 12/0246 |
| 2018/0113826 A1* | 4/2018 | Li | G06F 3/0622 |

* cited by examiner

MULTIMEDIA STREAMING AND NETWORK APPARATUS

RELATED APPLICATIONS

This application claims priority to Taiwan Application Serial Number 108106886, filed Feb. 27, 2019, which is herein incorporated by reference.

BACKGROUND

Field of Invention

The present invention relates to a multimedia streaming and network technology. More particularly, the present invention relates to a multimedia streaming and network apparatus.

Description of Related Art

Due to the rising of the Internet era, there are more and more multimedia streaming service provider that provides multimedia entertainment in an unconventional way. The multimedia streaming data is transmitted through network. As a result, a user is requested to have a network device and a multimedia streaming device at the same time to access the network through the network device and perform process on the multimedia stream received from the network by using the multimedia streaming device.

For the user, the cost is higher and a space is larger if both the network device and the multimedia streaming device are required to be disposed. As a result, whether the network device and the multimedia streaming device can be integrated or not to share the resource therebetween is an important issue if the hardware cost is required to be reduced.

Accordingly, what is needed is a multimedia streaming and network apparatus to address the issues mentioned above.

SUMMARY

An aspect of the present invention is to provide a multimedia streaming and network apparatus that includes a flash memory, a network module, an access module and a multimedia streaming module. The network module includes a network processing circuit. The access module includes a flash memory controller and an access circuit. The flash memory controller is configured to control and accesses the flash memory. The access circuit includes a network processing storage circuit, a command and data transmission circuit and an interface converting circuit. The command and data transmission circuit is configured to perform transmission of command and data between the processing storage circuit and the network processing circuit when the network processing storage circuit accesses the flash memory through the flash memory controller. The interface converting circuit is configured to perform transmission and interface conversion between the network processing storage circuit and the flash memory controller when the network processing storage circuit accesses the flash memory through the flash memory controller. The multimedia streaming module is configured to access the flash memory through the flash memory controller.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
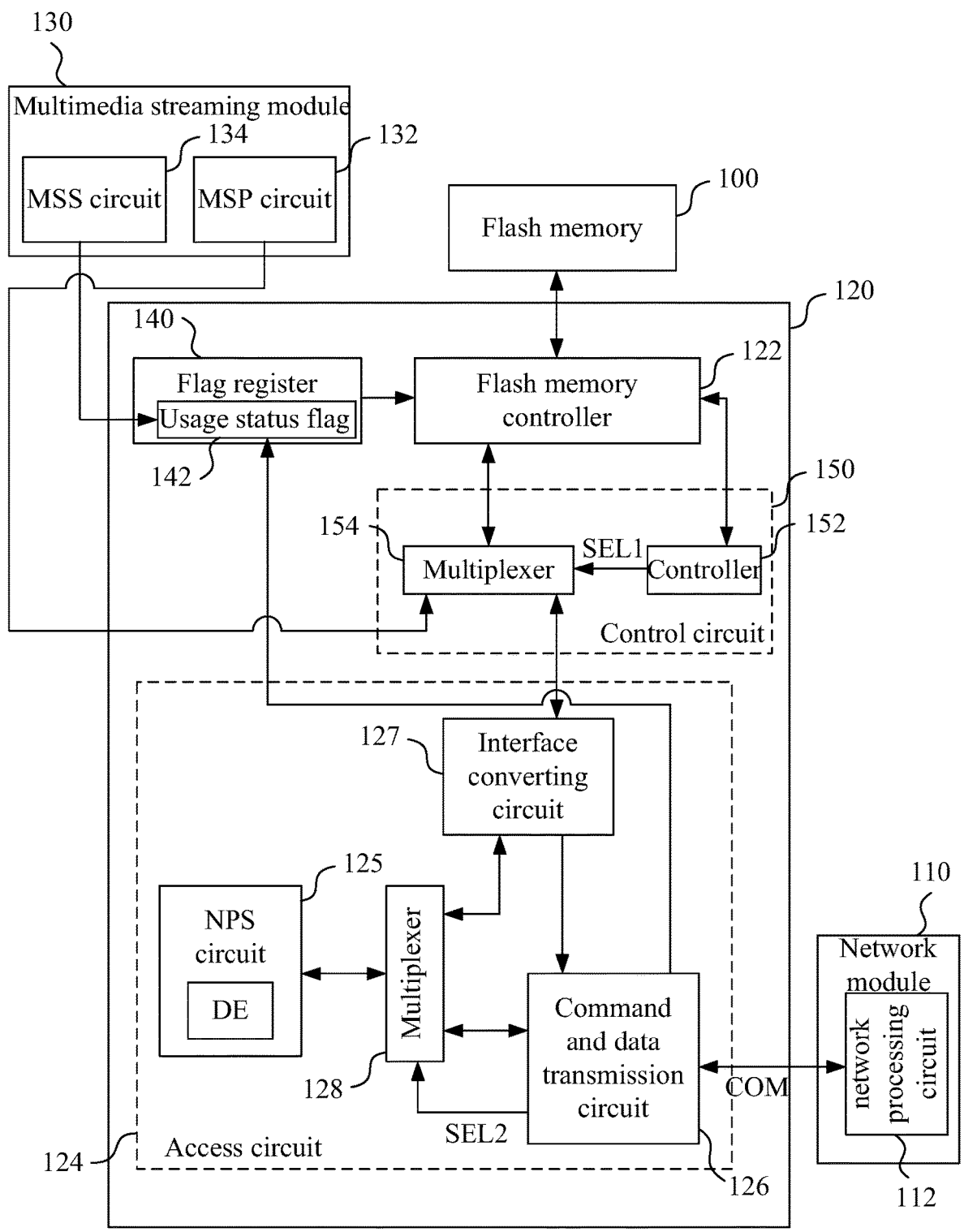
FIG. 1 is a block diagram of a multimedia streaming and network apparatus in an embodiment of the present invention.

Reference is made to FIG. 1. FIG. 1 is a block diagram of a multimedia streaming and network apparatus 1 in an embodiment of the present invention. The multimedia streaming and network apparatus 1 is a compound apparatus that can perform a multimedia streaming function and a network function. More specifically, the multimedia streaming and network apparatus 1 can perform the function of streaming of multimedia data of audio and video and the function of network data accessing.

The multimedia streaming and network apparatus 1 includes a flash memory 100, a network module 110, an access module 120 and a multimedia streaming module 130.

In an embodiment, the flash memory 100 includes non-volatile memory such as, but not limited to NAND flash memory. More specifically, under the condition that the power is not supplied, the flash memory 100 can still preserve the content of the stored data. Further, the flash memory 100 is accessed by using the embedded multimedia card (eMMC) technology.

The network module includes a network processing circuit.

The network module 110 is configured to perform the function of network data accessing when the network module 110 is powered. In an embodiment, the network module 110 can be the module implemented by such as, but not limited to the passive optical network (PON) technology.

The network module 110 at least includes a network processing circuit 112, in which the network processing circuit 112 can operate with other electronic components in the network module 110 to access external network through such as, but not limited to a wide area network (WAN) communication port (not illustrated) and access internal network through such as, but not limited to a local area network (LAN) communication port (not illustrated) and perform data transmission between the external network and the internal network. Other devices connected to the internal network, such as but not limited to the multimedia streaming module 130, a desktop, a laptop or a handheld electronic device connected to the network module 110 through wired or wireless connection can thus perform communication with the external network by using the network module 110.

The access module 120 includes a flash memory controller 122 and an access circuit 124.

In an embodiment, the flash memory controller 122 is configured to control and accesses the flash memory 100 according to the command from the network module 110 or the multimedia streaming module 130 by using the eMMC technology. In an embodiment, the access module 120 may further include an arbiter, a bridge or other components to operate together with the flash memory controller 122 to control and accesses the flash memory 100.

The access circuit 124 is configured to allow the network processing circuit 112 of the network module 110 to access the flash memory 100 through the access circuit 124 and the flash memory controller 122.

In an embodiment, the flash memory 100 can store initializing data that can initialize the network module 110. When the network module 110 is powered and start to operate, the network processing circuit 112 can access the initializing data in the flash memory 100 through the flash memory controller 122 by using the access circuit 124 to perform initialization. During operation, the network processing circuit 112 can also access the flash memory 100 through the flash memory controller 122 by using the access circuit 124 to perform data reading and data writing.

The multimedia streaming module 130 is configured to perform the function of multimedia streaming when the multimedia streaming module 130 is powered. In an embodiment, the multimedia streaming module 130 can be such as, but not limited to a module implemented by over-the-top (OTT) technology.

The multimedia streaming module 130 includes a multimedia streaming storage circuit 132 (abbreviated as MSS circuit in FIG. 1) and a multimedia streaming processing circuit 134 (abbreviated as MSP circuit in FIG. 1).

The multimedia streaming processing circuit 134 is configured to operate with other electronic components in the multimedia streaming module 130 to access multimedia stream from the remote server through a device that can access network (such as, but not limited to the network module 110), process the multimedia stream and transmit the multimedia stream to a playback device (not illustrated), such as but not limited to a television or a liquid crystal display (LCD).

The multimedia streaming processing circuit 134 is configured to perform data storage by using the multimedia streaming storage circuit 132 and accesses the flash memory 100 through the flash memory controller 122.

In an embodiment, the flash memory 100 can store initializing data that can initialize the multimedia streaming module 130. When the multimedia streaming module 130 is powered and start to operate, the multimedia streaming processing circuit 134 can access the initializing data in the flash memory 100 through the flash memory controller 122 to perform initialization. During operation, the multimedia streaming processing circuit 134 can also access the flash memory 100 through the flash memory controller 122 to perform data reading and data writing.

By using the configuration described above, the network module 110 and the multimedia streaming module 130 can share the flash memory 100 to perform data access through the flash memory controller 122 in the access module 120. The network module 110 requires the access circuit 124 in the access module 120 to perform format conversion with hardware such that the network module 110 can still rapidly communicate with the flash memory 100 that utilizes eMMC technology even if the network module 110 actually uses commands and data format of NAND flash memory.

In an embodiment, since the memory controller 122 can be used by the network module 110 and the multimedia streaming module 130 based on a sharing mechanism, a control circuit 150 is disposed in the access module 120 to accomplish such a mechanism. The control circuit 150 includes a controller 152 and a multiplexer 154. The controller 152 is configured to generate a selection signal SEA to the multiplexer 154 when one of the network module 110 and the multimedia streaming module 130 is able to control the flash memory controller 122 to select a path that is electrically coupled to either the network module 110 or the multimedia streaming module 130 such that the memory controller 122 is controlled to perform corresponding data transmission.

The detail of the configuration and the operation of the access circuit 124 included in the network module 110 is further described in the following paragraphs.

The access circuit 124 includes a network processing storage circuit 125 (abbreviated as NPS circuit in FIG. 1), a command and data transmission circuit 126 and an interface converting circuit 127.

In an embodiment, the network processing storage circuit 125 is a static random access memory (SRAM). The network processing storage circuit 125 is electrically coupled to the command and data transmission circuit 126 and the interface converting circuit 127. The network processing storage circuit 125 is configured to store the command and the data transmitted by the command and data transmission circuit 126 and the interface converting circuit 127.

In an embodiment, the network processing storage circuit 125 is electrically coupled to the command and data transmission circuit 126 and the interface converting circuit 127 through a multiplexer 128. More specifically, the multiplexer 128 has a first terminal electrically coupled to the network processing storage circuit 125 and a second terminal selectively electrically coupled to the command and data transmission circuit 126 through a first path or electrically coupled to the interface converting circuit 127 through a second path. In an embodiment, the multiplexer 128 determines which circuit to be electrically coupled to under the control of a selection signal SEL2 transmitted by the command and data transmission circuit 126.

The command and data transmission circuit 126 is electrically coupled to the network processing storage circuit 125 and the network processing circuit 112 and is configured to perform transmission of commands and data between the network processing storage circuit 125 and the network processing circuit 112.

The interface converting circuit 127 is electrically coupled to the network processing storage circuit 125 and the flash memory controller 122 and is configured to perform transmission and interface conversion between the network processing storage circuit 125 and the flash memory controller 122.

When the network processing circuit 112 is about to perform data access on the flash memory 100, the network processing circuit 112 generates an access command COM to the command and data transmission circuit 126. In an embodiment, the access command COM is a NAND flash memory access command and includes the information of the memory address to be accessed and the length of the data.

The command and data transmission circuit 126 further generates the selection signal SEL2 according to the access command COM to control the operation of the multiplexer 128. The multiplexer 128 can transmit the access command COM to the network processing storage circuit 125 such that the network processing storage circuit 125 converts the access command COM to descriptor data DE such that the interface converting circuit 127 performs interface format conversion on the descriptor data DE and transmits the descriptor data DE to the flash memory controller 122 so that the flash memory controller 122 accesses the flash memory 100 according to the descriptor data DE.

The access command COM can be such as, but not limited to a write command to perform write operation on the flash memory 100 or a read command to perform read operation on the flash memory 100. The conditions of write operation and read operation are respectively described in detail in the following paragraphs.

Figure 2A:
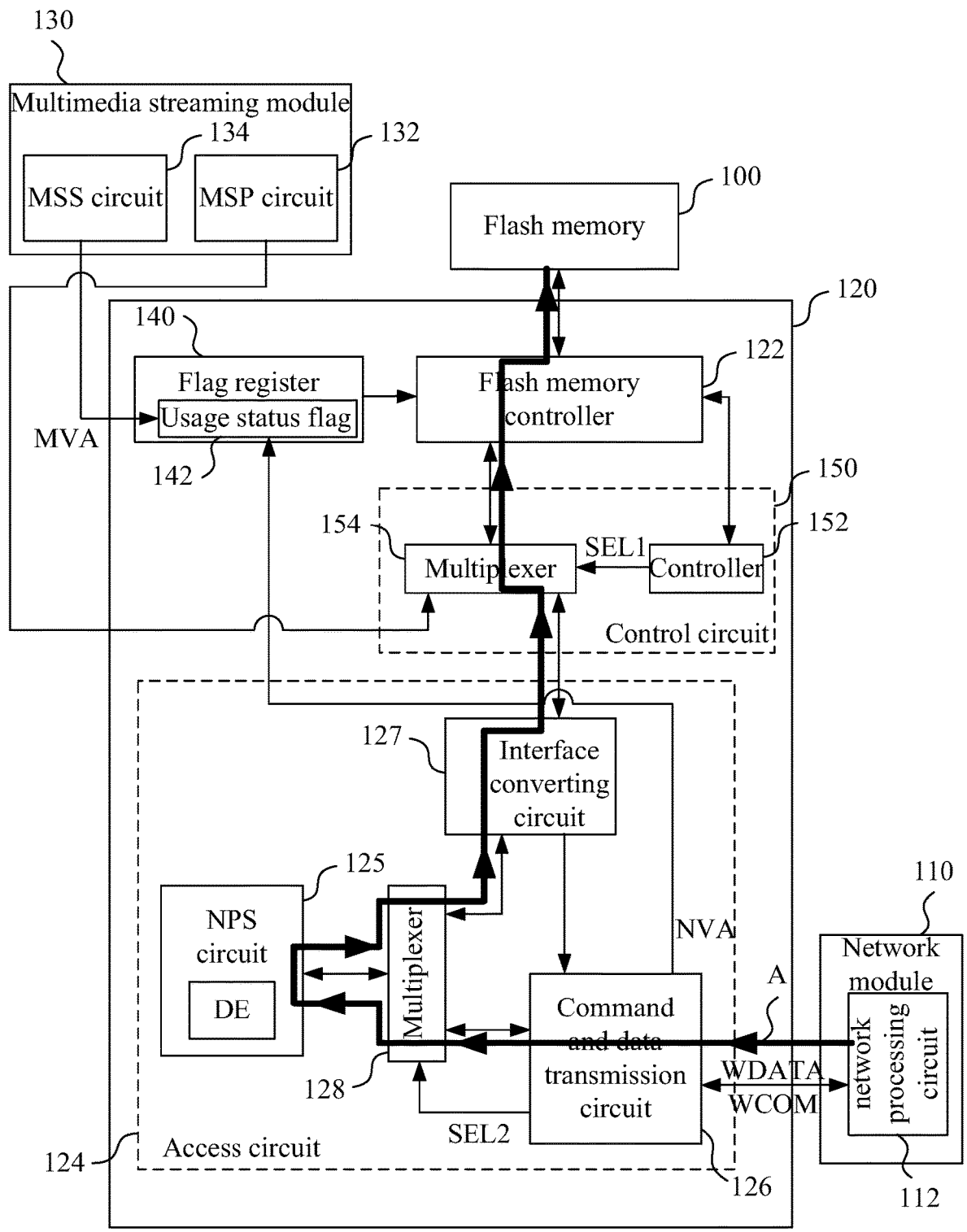
FIG. 2A is a block diagram of the multimedia streaming and network apparatus under the condition that the network processing circuit performs write operation on the flash memory in an embodiment of the present invention.

Reference is now made to FIG. 2A. FIG. 2A is a block diagram of the multimedia streaming and network apparatus 1 under the condition that the network processing circuit 112 performs write operation on the flash memory 100 in an embodiment of the present invention.

As illustrated in FIG. 2A, when the network module 110 performs write operation, the data-to-be-written WDATA provided by the network processing circuit 112 is transmitted to the flash memory 100 through a path A including the command and data transmission circuit 126, the network processing storage circuit 125, the interface converting circuit 127, the multiplexer 154 of the control circuit 150 and the flash memory controller 122.

At first, the multiplexer 128 is first electrically coupled to the command and data transmission circuit 126 and the network processing storage circuit 125 such that the network processing circuit 112 stores data-to-be-written WDATA to the network processing storage circuit 125 through the command and data transmission circuit 126. The network processing circuit 112 further transmits a write command WCOM to the network processing storage circuit 125 to be stored therein. When the write command WCOM is transmitted through the command and data transmission circuit 126, the command and data transmission circuit 126 delivers a network processing confirmation signal NVA to a flag register 140 such that the flag register 140 stores a network processing circuit usage status flag in a usage status flag 142. After the condition that no other operation is performed by the flash memory controller 122 is confirmed according to the usage status flag 142, the flash memory controller 122 reads the descriptor data of the network processing storage circuit 125 to perform the write operation.

Subsequently, the multiplexer 128 is electrically coupled to the interface converting circuit 127 and the network processing storage circuit 125 such that the interface converting circuit 127 retrieves the write command WCOM and the data-to-be-written WDATA from the network processing storage circuit 125, performs interface format conversion and transmits the write command WCOM and the data-to-be-written WDATA to the flash memory controller 122 through the multiplexer 154 to write the data-to-be-written WDATA to the flash memory 100 according to the write command WCOM.

Figure 2B:
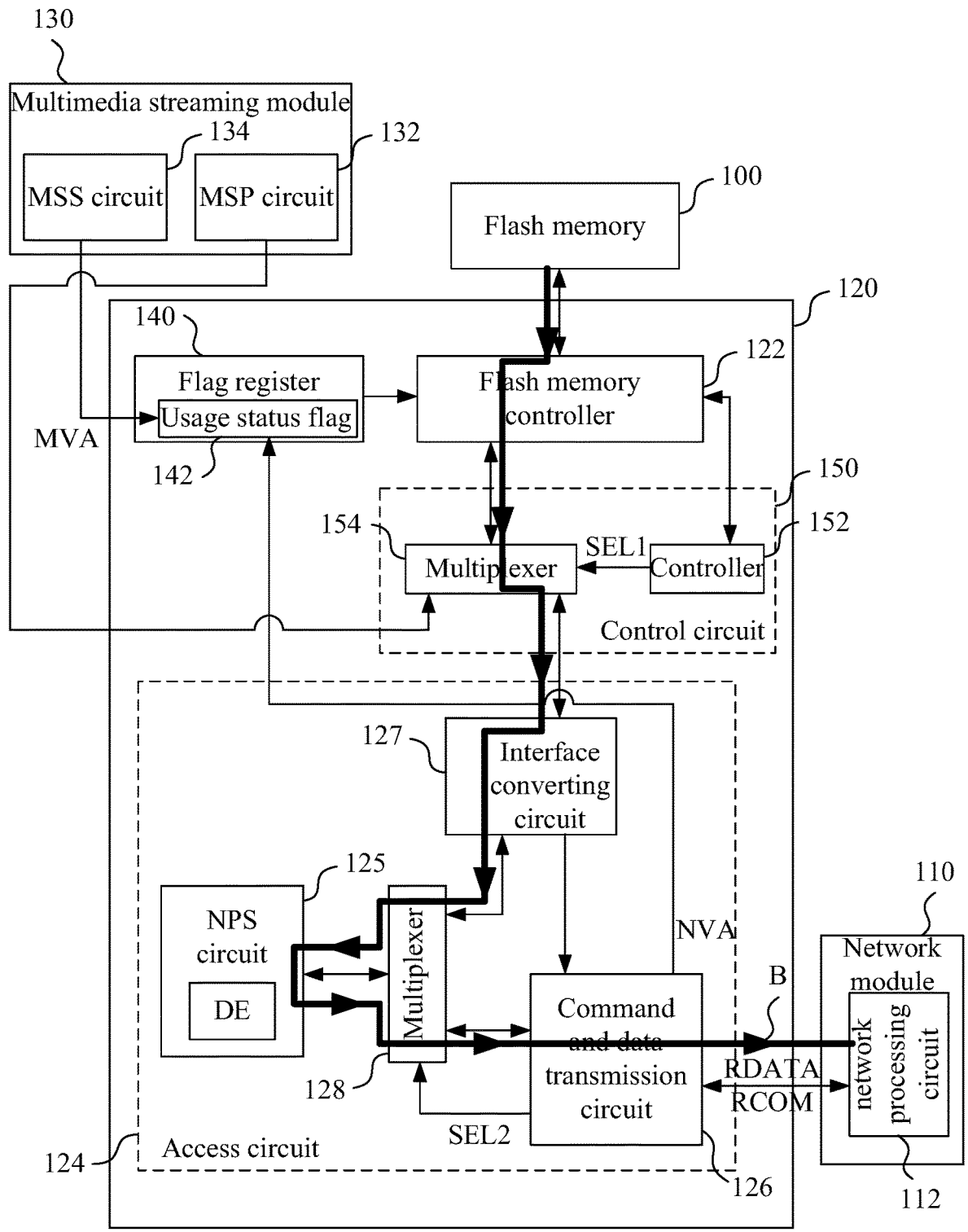
FIG. 2B is a block diagram of the multimedia streaming and network apparatus under the condition that the network processing circuit performs read operation on the flash memory in an embodiment of the present invention.

Reference is now made to FIG. 2B. FIG. 2B is a block diagram of the multimedia streaming and network apparatus 1 under the condition that the network processing circuit 112 performs read operation on the flash memory 100 in an embodiment of the present invention.

As illustrated in FIG. 2B, when the network module 110 performs read operation, the data-to-be-read RDATA that the network processing circuit 112 requires is transmitted from the flash memory 100 to the network processing circuit 112 through a path B including the flash memory controller 122, the multiplexer 154 of the control circuit 150, the interface converting circuit 127, the network processing storage circuit 125 and the command and data transmission circuit 126.

At first, the multiplexer 128 is first electrically coupled to the command and data transmission circuit 126 and the network processing storage circuit 125 such that the command and data transmission circuit 126 transmits a read command RCOM from the network processing circuit 112 to the network processing storage circuit 125 to be stored therein. When the write command RCOM is transmitted through the command and data transmission circuit 126, the command and data transmission circuit 126 delivers the network processing confirmation signal NVA to the flag register 140 such that the flag register 140 stores a network processing circuit usage status flag in a usage status flag 142. After the condition that no other operation is performed by the flash memory controller 122 is confirmed according to the usage status flag 142, the flash memory controller 122 reads the descriptor data of the network processing storage circuit 125 to perform the read operation.

Subsequently, the multiplexer 128 is further electrically couple to the interface converting circuit 127 and the network processing storage circuit 125 such that the interface converting circuit 127 retrieves the read command RCOM from the network processing storage circuit 125, reads the data-to-be-read RDATA according to the read command RCOM through the multiplexer 154, performs interface format conversion and stores the data-to-be-read RDATA in the network processing storage circuit 125.

At last, the multiplexer 128 is electrically coupled to the command and data transmission circuit 126 and the network processing storage circuit 125 such that the command and data transmission circuit 126 retrieves the data-to-be-read RDATA from the network processing storage circuit 125 and transmits the data-to-be-read RDATA to the network processing circuit 112.

In an embodiment, the multimedia streaming and network apparatus 1 further includes the flag register 140 configured to store the usage status flag 142. When the network processing circuit 112 accesses the flash memory 100, the command and data transmission circuit 126 delivers the network processing confirmation signal NVA to the flag register 140 such that the flag register 140 stores the network processing circuit usage status flag in a usage status flag 142. The multimedia streaming module 130 thus does not access the flash memory 100 when the multimedia streaming module 130 reads the network processing circuit usage status flag.

In an embodiment, after the network processing circuit 112 finishes accessing the flash memory 100, the command and data transmission circuit 126 resets the usage status flag 142 of the flag register 140 to allow the multimedia streaming module 130 accessing the flash memory 100.

Similarly, the multimedia streaming processing circuit 134 transmits a multimedia streaming processing confirmation signal MVA to the flag register 140 when the multimedia streaming processing module 130 accesses the flash memory 100 such that the flag register 140 stores a multimedia streaming processing circuit usage status flag in the usage status flag 142, so that the network module 110 does not access the flash memory 100 when the command and data transmission circuit 126 reads the multimedia streaming processing circuit usage status flag in the flag register 140.

In an embodiment, after the multimedia streaming processing circuit 134 finishes accessing the flash memory 100, the multimedia streaming processing circuit 134 resets the usage status flag 142 of the flag register 140 to allow the network module 110 accessing the flash memory 100.

Such a configuration can avoid the simultaneous access of the network module 110 and the multimedia streaming processing module 130 performed on the flash memory 100.

In an embodiment, the access module 120 is disposed in an uninterruptable power area such that when the multimedia streaming module 130 enters a sleep mode or a power-off mode, the network module 110 is kept in operation to access the flash memory 100 through the access module 120. More specifically, when the user does not watch the multimedia stream provided by the multimedia streaming processing module 130, the operation of the network module 110 is not affected. The user can still access network through the network module 100.

As a result, the multimedia streaming and network apparatus 1 of the present invention allows the network module 110 and the multimedia streaming processing module 130 share the same flash memory 100 to greatly reduce the cost of the disposition of an additional flash memory. Moreover, the network module 110 can perform conversion of the format of commands and data by using hardware through the usage of the access module 120 to rapidly access the flash memory 100.

Furthermore, since the access module 120 can be disposed in the uninterruptable power area, the network module 110 can be kept in operation to access network without being limited by whether the multimedia streaming processing module 130 is in operation or not.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A multimedia streaming and network apparatus, comprising:
    a flash memory;
    a network module comprising a network processing circuit;
    an access module comprising:
        a flag register configured to store a usage status flag;
        a flash memory controller configured to control and accesses the flash memory; and
        an access circuit comprising:
            a network processing storage circuit;
            a command and data transmission circuit configured to perform transmission of command and data between the processing storage circuit and the network processing circuit when the network processing storage circuit accesses the flash memory through the flash memory controller; and
            an interface converting circuit configured to perform transmission and interface conversion between the network processing storage circuit and the flash memory controller when the network processing storage circuit accesses the flash memory through the flash memory controller; and
    a multimedia streaming module configured to determine whether access the flash memory through the flash memory controller according to the usage status flag.

2. The multimedia streaming and network apparatus of claim 1, wherein the command and data transmission circuit further transmits a network processing confirmation signal to the flag register such that the flag register stores a network processing circuit usage status flag into the usage status flag when the network processing storage circuit accesses the flash memory, so that the multimedia streaming module does not access the flash memory when the multimedia streaming module reads the network processing circuit usage status flag in the flag register.

3. The multimedia streaming and network apparatus of claim 1, wherein the access module further comprises a multiplexer having a first terminal electrically coupled to the network processing storage circuit and a second terminal selectively electrically coupled to the command and data transmission circuit through a first path or electrically coupled to the interface converting circuit through a second path under control of the command and data transmission circuit;
    when the network processing circuit performs write operation on the flash memory, the multiplexer is first electrically coupled to the command and data transmission circuit and the network processing storage circuit such that the network processing circuit stores data-to-be-written to the network processing storage circuit through the command and data transmission circuit and transmits a write command to the network processing storage circuit and the multiplexer is subsequently electrically coupled to the interface converting circuit and the network processing storage circuit such that the interface converting circuit retrieves the write command and the data-to-be-written from the network processing storage circuit, performs interface format conversion and transmits the write command and the data-to-be-written to the flash memory controller to write the data-to-be-written to the flash memory according to the write command;
    when the network processing circuit performs read operation on the flash memory, the multiplexer is first electrically coupled to the command and data transmission circuit and the network processing storage circuit such that the command and data transmission circuit transmits a read command to the network processing storage circuit, the multiplexer is further electrically couple to the interface converting circuit and the network processing storage circuit such that the interface converting circuit retrieves the read command from the network processing storage circuit, reads data-to-be-read, performs interface format conversion and stores the data-to-be-read in the network processing storage circuit, and the multiplexer is subsequently electrically coupled to the command and data transmission circuit and the network processing storage circuit such that the command and data transmission circuit retrieves the data-to-be-read from the network processing storage circuit and transmits the data-to-be-read to the network processing circuit.

4. The multimedia streaming and network apparatus of claim 1, wherein the network processing storage circuit is a static random access memory (SRAM).

5. The multimedia streaming and network apparatus of claim 1, wherein the flash memory is accessed by using an embedded multimedia card (eMMC) technology and the flash memory comprises a NAND flash memory.

6. The multimedia streaming and network apparatus of claim 1, wherein the network processing storage circuit further converts an access command transmitted by the network processing circuit through the command and data transmission circuit to descriptor data such that the interface converting circuit performs interface format conversion on the descriptor data and transmits the descriptor data to the flash memory controller so that the flash memory controller accesses the flash memory according to the descriptor data.

7. The multimedia streaming and network apparatus of claim 6, wherein the access command is a NAND flash memory access command.

8. The multimedia streaming and network apparatus of claim 1, wherein the multimedia streaming module comprises:
- a multimedia streaming storage circuit; and
- a multimedia streaming processing circuit configured to perform data storage by using the multimedia streaming storage circuit and accesses the flash memory through the flash memory controller.

9. The multimedia streaming and network apparatus of claim 8, wherein the multimedia streaming processing circuit transmits a multimedia streaming processing confirmation signal to the flag register when the multimedia streaming processing circuit accesses the flash memory such that the flag register stores a multimedia streaming processing circuit usage status flag into the usage status flag, so that the network module does not access the flash memory when the command and data transmission circuit reads the multimedia streaming processing circuit usage status flag in the flag register.

10. The multimedia streaming and network apparatus of claim 1, wherein the access module is disposed in an uninterruptable power area such that when the multimedia streaming module enters a sleep mode or a power-off mode, the network module is kept in operation to access the flash memory through the access module.

* * * * *